United States Patent [19]

Calbo, Jr.

[11] 3,939,121

[45] Feb. 17, 1976

[54] THERMOSETTING TOLUENE-SOLUBLE WATER-INSOLUBLE ALKYLATED UREA-FORMALDEHYDE RESIN AND PROCESS FOR THE MANUFACTURE THEREOF

[75] Inventor: Leonard Joseph Calbo, Jr., Ardsley, N.Y.

[73] Assignee: American Cyanamid Company, Stamford, Conn.

[22] Filed: Jan. 4, 1974

[21] Appl. No.: 430,802

[52] U.S. Cl. .......................... 260/70 A; 260/33.6 R
[51] Int. Cl.² .......................................... C08G 14/02
[58] Field of Search ............. 260/70 A; 117/132 BF

[56] References Cited
UNITED STATES PATENTS

| | | | |
|---|---|---|---|
| 2,191,957 | 2/1940 | Edgar et al. ...................... | 260/70 A |
| 2,322,979 | 6/1943 | Siegel............................... | 260/70 A |
| 2,326,265 | 8/1943 | Tawney............................. | 260/70 A |
| 2,377,422 | 6/1945 | Hodgins et al.................... | 260/70 A |
| 2,544,351 | 3/1951 | Parker .............................. | 260/70 A |
| 2,600,100 | 6/1952 | Evans et al. ..................... | 260/70 A X |
| 3,392,150 | 7/1968 | Groll................................ | 260/70 A X |
| 3,803,095 | 4/1974 | Calbo et al. ..................... | 260/70 A |

FOREIGN PATENTS OR APPLICATIONS

| | | | |
|---|---|---|---|
| 521,380 | 5/1940 | United Kingdom.............. | 260/70 A |

Primary Examiner—Howard E. Schain
Assistant Examiner—W. C. Danison, Jr.
Attorney, Agent, or Firm—James T. Dunn

[57] ABSTRACT

Resins composed of interreacted urea, formaldehyde and a non-tertiary $C_{4-6}$ alkanol in 1:2.3–2.7:1.3–1.8 molar ratio containing 0.3–0.7 mol of methylol substituents per mol of interreacted urea therein having molecular weights in the range 350 – 700 are thermosetting, toluene-soluble, and water-insoluble, and are of pumpable viscosity. They are made by a multi-step process containing two acid alkylation steps with intervening removal of water.

17 Claims, No Drawings

THERMOSETTING TOLUENE-SOLUBLE WATER-INSOLUBLE ALKYLATED UREA-FORMALDEHYDE RESIN AND PROCESS FOR THE MANUFACTURE THEREOF

BACKGROUND OF THE INVENTION

The present invention relates to novel alkylated urea-formaldehyde resins and to methods for the preparation thereof. More particularly, the invention relates to such resins which are thermosetting, which are soluble in at least their own weight of toluene, and which are of pumpable viscosity even when containing no solvent thinner or other diluent material. The invention further relates to the production of these resins by a process involving a double alkylation step with predetermined combinations of temperature and pH, resulting in formation of a resin of critical molecular weight containing methylol and alkylated methylol substituents in critical proportion.

DESCRIPTION OF THE PRIOR ART

Thermosetting toluene-soluble alkylated urea-formaldehyde resins have long been commercially available and are in wide commercial use as components of surface coatings. A disadvantage of these resins is that they are very viscous, so viscous in fact that they cannot be pumped in pumps available to the lacquer and enamel manufacturer unless they are thinned with a volatile organic solvent. Volatile organic solvents are usually inflammable, and resins containing such solvents require special safeguards when shipped and stored. It is a disadvantage of resins containing such solvents that they are intrinsically dangerous to handle.

A particular and increasingly important disadvantage of resins containing such solvents is that under the Federal Clean Air Act (and under many State and municipal counterpart acts) lacquers, paints, enamels, etc. containing these resin-solvent solutions cannot be applied except within a solvent recovery system adequate to prevent the solvent content of these coatings from escaping into the atmosphere. Solvent recovery systems are costly to install and to maintain, and there is always the danger of an explosion.

A demand has accordingly arisen for a thermosetting toluene-soluble alkylated urea-formaldehyde resin which is of pumpable viscosity at room or at elevated temperature when containing no solvent, diluent or thinner, yet which thermosets rapidly at conventional baking temperatures to a hard, enamel-like state. Such a resin should also be compatible with the solvents and alkyd resins still customarily employed in the formulation of baking enamels and other surface coatings.

SUMMARY OF THE INVENTION

The discovery has now been made that this demand is met by alkylated urea-formaldehyde products which are composed of interreacted urea, formaldehyde and a non-tertiary $C_{4-6}$ alkanol (or mixture of such alkanols) in 1:2.3–2.7:1.3–1.8 molar ratio respectively. The molar ratio of urea to unalkylated methylol substituents in the products is 1:0.3–0.7 and the products have a number average molecular weight between 350 and 700. Since the products are viscous liquids, for convenience they are herein generally termed "resins".

The further discovery has been made that resins of this description have a viscosity sufficiently low that they can be pumped at room or at elevated temperatures when containing no solvent diluent or thinner (i.e., at 100% resin solids content), and that they are adequately soluble in solvents used for lacquer and enamel manufacturing purposes, e.g., in benzene, toluene, xylene, petroleum naphtha, acetone, ethyl acetate, n-butanol, and isobutanol. Moreover, the resins are compatible with the principal alkyd resins which are used for the formulation of bake-type enamel finishes, and possess remarkable stability in that they remain of pumpable viscosity when stored at room temperature for six months.

The resins of the present invention are insoluble in water and so are suitable for use in the formulation of latex paints, varnishes and enamels.

DETAILED DESCRIPTION

The structure of the resins of the present invention is illustrated by the following formula, which is representative of the average structure of the resin of the present invention at dimeric weight:

I.
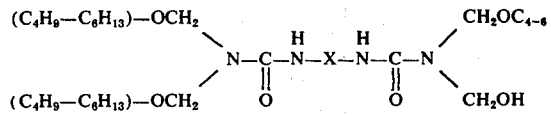

In this formula the "$C_{4-6}$" substituents represent non-tertiary alkyl substituents and "X" represents methylene ($-CH_2-$) or methyleneoxy ($-CH_2OCH_2-$). In the formula, the molar ratio of combined urea, formaldehyde and $C_{4-6}$ alkanol is 1:2.5:1.5, and the molar ratio of combined urea to unalkylated methylol substituents is 1:0.5. When the $C_{4-6}$ alkyl substituents are butyl, and X is methylene, the molecular weight of the resin illustrated by the formula is 436. However, the relative positions of the substituents attached to the nitrogen atoms are variable, and therefore the resins may be and probably are composed of position isomers of the resin illustrated.

The resins of the present invention are made by a process involving numerous critical steps.

In the first step, urea and formaldehyde are interreacted at an alkaline pH in molar ratio to form a mixture of methylolureas and methylolurea derivatives (molar ratio urea: reacted formaldehyde = 1:2.3–2.7 and preferably 1:2.5). In this step, it is advantageous to employ an excess of formaldehyde, but the reaction is stopped when the urea has reacted with the above-indicated amount of formaldehyde. The unreacted excess can be distilled off and reused. A large excess of formaldehyde can be employed without harm, but no advantage has been found in adding more than six mols of formaldehyde per mol of urea. The reaction can be performed at any alkaline pH, but the range of 7–9 gives good results and is therefore preferred. The reaction proceeds between room and reflux temperatures. Aqueous formaldehyde (or if preferred, paraformaldehyde) can be employed.

The product of the reaction is a mixture principally composed of dimethylolurea, trimethylolurea, and low condensation products thereof (predominantly smaller then pentameric).

When paraformaldehyde is employed, the reaction product contains at most a negligible amount of water and can be used for the next step (the first alkylation step) without treatment. However, when aqueous formaldehyde is employed, the residual water, when present in amounts larger than about 30% of the weight of the non-volatiles ("solids") therein, interferes unduly with the alkylation reaction, and this excess must be removed.

Accordingly, when aqueous formaldehyde is employed, in the next step the solution is concentrated to at least 50% and preferably to 70% to 95% non-volatiles or more to remove most of and preferably substantially all of the water.

The third main step of the process (the first alkylation) is performed by heating the above-described product with an excess of $C_{4-6}$ alkanol (or mixture of such alkanols) at a predetermined pH and temperature such that a substantial proportion (at least 30%) of the methylol substituents are alkylated and yet polymerization of the methylolureas (with and without alkylation) occurs to no more than a negligible extent, i.e., so that at least about one-half of the ureas are not larger than dimeric. One suitable combination is a pH in the range of 4 to 6 and a temperature between 70°C. and reflux. Another combination is a pH less than 2 and a temperature between 20°C. and 55°C. Other suitable combinations can be found by laboratory trial. The alkylation is preferably continued until the reaction becomes very slow or virtually ceases, with alkylation of more than half of the methylol groups present in the starting mixture of methylolureas.

When at least 30% of the methylol groups have become alkylated and the alkylation reaction has become undesirably slow, the mixture is concentrated to remove excess water and excess alkanol and to raise its non-volatile content to at least 80% by weight.

The mixture is then subjected to a second alkylation, with a $C_{4-6}$ alkanol or mixture of alkanols. The alkylation is performed at a pH below about 2, the solution being maintained at a temperature within the range of 25°C. to 55°C. until the alkylated methylolureas contain between about 1.3 and 1.8 mol of the $C_{4-6}$ alkanol (or mixture of said alkanols) and the number of unalkylated methylol substituents has decreased to less than 0.7 but has not decreased below 0.3 mol per mol of combined urea present.

The process is terminated by raising the pH of the mixture above 7 (preferably to 7.5–8.5). If desired, the mixture may be concentrated to substantially 100% solids, thereby removing substantially all the water and unreacted formaldehyde and alkanol or alkanols. The product, both before and after final concentration, is stable for six months at room temperature.

In the alkylation reactions, preferably the alkanol (or mixture of alkanols) is added in excess. However, more than three times the stoichiometric amount confers only slight benefit, which is therefore regarded as the practical maximum.

The three concentration steps described above can be performed in any convenient way, the preferred object being to remove substantially all the volatile material present (chiefly water, unreacted formaldehyde and unreacted alkanol). Vacuum distillation (less than 50 mm. of Hg) permits these components to be removed substantially completely and is therefore preferred.

The pH adjustments can be made by addition of 50% sodium hydroxide solution or concentrated sulfuric or nitric acids, as the step in each instance may require. However, volatile acids (formic acid or acetic acid) and volatile bases (triethanolamine, or morpholine) can also be used. They volatilize at temperatures at which surface coatings are customarily baked, and so do not introduce any hydrophilic component into the surface coatings.

Suitable alkanols include any non-tertiary $C_{4-6}$ alkanol. Among these are n-butanol, iso-butanol, n-amyl alcohol and n-hexyl alcohol which are preferred because of the ease with which they react with the methylolurea.

When the steps set forth above are followed, the product has a number average molecular weight between about 350 and 700. When our preferred methods are employed, the products generally have molecular weights in the range of about 400 to 500.

The products are water-white but sometimes possess a haze. Products possessing this haze do not appear to be inferior in any respect except appearance, so that this haze appears harmless. The haze can be removed by filtration. The filtered product is a water-clear sparkling syrup which is soluble in at least its own weight of toluene and which is of pumpable viscosity; that is, it can be pumped at room or elevated temperature in any of the pumps customarily used in the surface coating industry to pump components of varnishes and enamels.

DESCRIPTION OF THE PREFERRED EMBODIMENTS

The invention is further illustrated by the preferred embodiments (examples) which follow. The claims are not to be construed as limited thereto.

EXAMPLE 1

The following illustrates the preparation of a preferred resin according to the present invention by the embodiment of the process wherein the alkylation is performed first at reflux temperature at a slightly acid pH and then at about room temperature at highly acid pH, to provide a syrup of substantially 100% resins solids which is of pumpable viscosity at room temperature and which is soluble in its own weight of toluene. It contains about 0.5 —$CH_2$OH substituents per urea residue present.

1014 g. of 44% formalin (14.85 mols) in a flask equipped with stirrer, condenser, and thermometer is adjusted to pH 7.4 with triethanolamine. To this is added 270 g. (4.5 mols) of urea. The mixture is heated to 80°C. and is maintained at that temperature for 30 minutes, after which the mixture is subjected to vacuum distillation at 50° – 70°C. until about 95% of the water in the mixture has been removed. To this is added 1166 g. (15.75 mols) of n-butanol, and the pH of the mixture is adjusted to 5 by addition of 90% formic acid. The mixture is first refluxed for 10 –15 minutes and is then decanted until 205 mol of the water/butanol azetrope has been taken off. The mixture is then cooled to 35°C. and its pH is adjusted to 7.5 by addition of aqueous 50% sodium hydroxide. The mixture is then vacuum concentrated to a terminal temperature of 90°–95°C., at which point the solids content of the mixture is 90%. The mixture is cooled, and to it is added 666 g. of butanol (9.0 mols) and sufficient 70% nitric acid to lower the pH to 1.5. The mixture is then stirred at 50°C. for 30 minutes, adjusted to pH 7.5 with sodium hydroxide, vacuum concentrated to 100% solids at 100°C. and filtered. The filtrate is a clear syrup which is composed of combined urea, formaldehyde and butanol in about 1:2.4:1.4 molar ratio and which contains about 0.5 mol of —$CH_2OH$ substituent per mol of combined urea present. It has a molecular weight of about 450, and a Gardner-Holdt viscosity of $Z_2$ at 25°C. It is soluble in its own weight of toluene at 20°C. It is pumpable at room temperature.

EXAMPLE 2

The following illustrates the preparation of a resin syrup similar to that of Example 1 but having an even lower viscosity.

To a 3-liter flask equipped with thermometer, stirrer and condenser containing 1105 g. of 44% formalin (16.2 mols) adjusted to pH 8.3 by addition of 50% aqueous sodium hydroxide is added 270 g. (4.5 mols) or urea. The mixture is heated to 80°C. and held there for 30 minutes, after which time vacuum is applied and approximately 95% of the water present is removed by vacuum distillation at 50°–70°C. To this is added 999 g. (13.5 mols) of n-butanol and the pH is adjusted to 1.5 by addition of concentrated sulfuric acid. The mixture is stirred for 30 minutes at 40°C. It is then neutralized to pH 7 with 50% sodium hydroxide, and is subjected to vacuum distillation until it contains 86% solids. The non-solids in the syrup are largely butanol and formaldehyde. To this is added 666 g. (9.0 mols) of n-butanol and the pH of the mixture adjusted to 1 with concentrated sulfuric acid. The mixture is held with stirring at 40°C. for 30 minutes and is then neutralized with 50% sodium hydroxide. Vacuum is applied and the mixture stripped of all volatiles to 100°C. The residue is essentially composed of resin solids. It has a Gardner-Holdt viscosity of Y at 25°C. and is readily pumped. The ratio of combined urea, formaldehyde and butanol in the polymer is 1:2.51.6. It contains about 0.4 —$CH_2OH$ substituents per mol of combined urea present. The syrup is soluble in its own weight of toluene. It is composed of about 34% monomer by weight, 15% dimer, and 51% higher polymeric forms, and has a number average molecular weight of about 450.

EXAMPLE 3

The procedure of Example 1 is repeated except that amyl alcohol is used in place of butanol. A similar syrup is obtained.

EXAMPLE 4

The following illustrates a pumpable syrup according to the present invention wherein the alkyl substituents in the resin are hexyl ($C_6$) substituents.

The procedure of Example 1 is repeated except that n-hexanol is used in place of the butanol. A similar syrup is obtained.

I claim:

1. A thermosetting, storage-stable, toluene-soluble, water-insoluble, alkylated urea-formaldehyde resin of pumpable viscosity, at room temperature, at 100% resin solids content composed of interreacted urea, formaldehyde and a non-tertiary $C_{4-6}$ alkanol in 1:2.3–2.7:–1.3–1.8 molar ratio respectively; the number average molecular weight of the resin being between about 350 and 700, and said resin containing between 0.3 and 0.7 mol of methylol substituents per mol of interreacted urea therein.

2. A resin according to claim 1 containing substantially no thinner or solvent.

3. A resin according to claim wherein the $C_{4-6}$ alkanol is n-butanol.

4. A resin according to claim 1 composed of interreacted urea, formaldehyde, and n-butanol in 1:2.5:1.5 molar ratio.

5. A resin according to claim 1 wherein the resin has a number average molecular weight between about 400 and 500.

6. A process for the manufacture of a thermosetting toluene-soluble water-insoluble alkylated urea-formaldehyde resin according to claim 1, which consists essentially in the following steps:
  1. reacting 1 mol of urea with about 2.3 to 2.7 mols of formaldehyde at a non-acid pH in aqueous solution;
  2. concentrating the reaction product to at least 50% solids;
  3. adding to the residue an excess of a non-tertiary $C_{4-6}$ alkanol or mixture of non-tertiary $C_{4-6}$ alkanols in stoichiometric excess;
  4. maintaining the resulting solution at a predetermined pH below 7 and at a predetermined temperature between 20°C. and reflux at which combination of pH and temperature alkylation of said reaction product proceeds rapidly and polymerization of said reaction product proceeds slowly, whereby a urea-formaldehyde resin is obtained at least 30% of the methylol groups of which are alkylated and which has a number average molecular weight between 350 and 700;
  5. concentrating the reaction product to at least 80% solids;
  6. adding to the residue said alkanol or a mixture of said alkanols in stoichiometric excess;
  7. acidifying the resulting solution to a pH below about 2;
  8. maintaining the solution at about 25°C. to 55°C. until the reaction product contains between about 1.3 and 1.8 mol of said $C_{4-6}$ alkanol or mixture of said alkanols and until it contains 0.3 to 0.7 mol of methylol substituents per mol of combined urea present; and
  9. raising the pH of the solution about 7.

7. A process according to claim 6 wherein in step (1) thereof the urea and the formaldehyde are reacted at pH 7.5–8.5 and at the reflux temperature of the solution.

8. A process according to claim 6 wherein in step (2) thereof the reaction product is concentrated to at least 70% solids.

9. A process according to claim 6 wherein the alkanol added is n-butanol.

10. A process according to claim 6 wherein in step (4) thereof the solution is heated at a temperature between 70°C. and reflux and at pH 4 to 6.

11. A process according to claim 6 wherein in step (4) thereof the solution is heated at a temperature between 20°C. and 50°C. and at a pH less than 2.

12. A process according to claim 6 wherein in step (4) thereof the solution is maintained at the predetermined pH and temperature until alkylation of said reaction product has substantially ceased.

13. A process according to claim 6 wherein in step (7) thereof the solution is acidified to a pH in the range of 0.5 to 1.

14. A process according to claim 6 wherein in step (8) thereof the solution is maintained at about 50°C. until the reaction product contains about 1.5 mol of $C_{4-6}$ alkanol.

15. A process according to claim 6 wherein the concentrations are performed under a vacuum of less than 50 mm. of Hg.

16. A process for the manufacture of a thermosetting toluene-soluble water-insoluble alkylated urea-formaldehyde resin according to claim 1, which consists essentially in the steps of:
   1. reacting 1 mol of urea with about 2.3 to 2.7 mols of paraformaldehyde at an alkaline pH;
   2. adding to the reaction product a non-tertiary $C_{4-6}$ alkanol or mixture of non-tertiary alkanols in stoichiometric excess;
   3. maintaining the resulting solution at a predetermined pH below 7 and at a predetermined temperature between 20°C. and reflux at which combination of pH and temperature alkylation of said reaction product proceeds rapidly and polymerization of said reaction product proceeds slowly, whereby a urea-formaldehyde resin is obtained at least 30% of the methylol groups of which are alkylated and which has a number average molecular weight between 350 and 700;
   4. concentrating the resulting solution to at least 80% solids;
   5. adding to the residue said alkanol or said mixture of alkanols in stoichiometric excess;
   6. acidifying the resulting solution to a pH below about 2;
   7. maintaining the solution at about 25°C. to about 55°C. until the reaction product contains between about 1.3 and 1.8 mol of said $C_{4-6}$ alkanol or mixture of said alkanols and until it contains 0.3 to 0.7 mol of methylol substituents per mol of combined urea present; and
   8. raising the pH of the solution above 7.

17. A process for the manufacture of a thermosetting toluene-soluble water-insoluble butylated urea-formaldehyde resin according to claim 1, which consists essentially in the following steps:
   1. reacting 1 mol of urea with 2.5 mols of formaldehyde at pH 7.5–8.5 in aqueous solution;
   2. concentrating the solution to at least 70% solids by weight;
   3. adding to said solution an excess of n-butanol;
   4. adjusting the pH of the solution below 2 and maintaining the solution at about 20°C. to 50°C. until reaction of said n-butanol has become negligibly slow;
   5. adjusting the pH of the solution to a value about 8;
   6. concentrating to at least 70% solids;
   7. adding n-butanol in stoichiometric excess;
   8. acidifying the solution to about pH 1;
   9. maintaining the solution at about 25°C. to 30°C. until the reaction product has a content of about 1.5 mol of said butanol;
   10. raising the pH of the solution to about 8; and
   11. concentrating the solution to substantially 100% solids.

* * * * *

UNITED STATES PATENT OFFICE
CERTIFICATE OF CORRECTION

Patent No. 3,939,121        Dated 2/17/76

Inventor(s) Leonard Joseph Calbo, Jr.

It is certified that error appears in the above-identified patent and that said Letters Patent are hereby corrected as shown below:

Column 4, line 62, change "mol" to -- ml. -- .

Column 5, line 41, insert -- : -- after "5".

Column 6, line 5, insert -- 1 -- after "claim".

Signed and Sealed this twenty-fifth Day of May 1976

[SEAL]

Attest:

RUTH C. MASON
*Attesting Officer*

C. MARSHALL DANN
*Commissioner of Patents and Trademarks*